United States Patent
Yanof et al.

(10) Patent No.: US 12,484,974 B2
(45) Date of Patent: Dec. 2, 2025

(54) PLANNING AND PERFORMING THREE-DIMENSIONAL HOLOGRAPHIC INTERVENTIONAL PROCEDURES WITH HOLOGRAPHIC GUIDE

(71) Applicant: MEDIVIEW XR, INC., Cleveland, OH (US)

(72) Inventors: Jeffrey H. Yanof, Cleveland, OH (US); Peter Nicholas Braido, Wyoming, MN (US); Aydan Thomas Hanlon, Shaker Heights, OH (US); Ross Daniel Hinrichsen, Minneapolis, MN (US)

(73) Assignee: MEDIVIEW XR, INC., Cleveland, OH (US)

( * ) Notice: Subject to any disclaimer, the term of this patent is extended or adjusted under 35 U.S.C. 154(b) by 33 days.

(21) Appl. No.: 18/399,984

(22) Filed: Dec. 29, 2023

(65) Prior Publication Data

US 2024/0225748 A1 Jul. 11, 2024

Related U.S. Application Data

(60) Provisional application No. 63/479,139, filed on Jan. 9, 2023.

(51) Int. Cl.
*A61B 90/00* (2016.01)
*A61B 34/10* (2016.01)
*A61B 34/20* (2016.01)

(52) U.S. Cl.
CPC .............. *A61B 34/20* (2016.02); *A61B 34/10* (2016.02); *A61B 90/37* (2016.02); *A61B 2034/2063* (2016.02); *A61B 2090/365* (2016.02)

(58) Field of Classification Search
CPC .............. A61B 34/20; A61B 2090/365; A61B 2034/107
See application file for complete search history.

(56) References Cited

U.S. PATENT DOCUMENTS 11,701,183 B2 7/2023 Martin, Iii et al.
2018/0303563 A1 10/2018 West et al.
(Continued)

FOREIGN PATENT DOCUMENTS

WO 2021231293 A1 11/2021

OTHER PUBLICATIONS

Written Opinion of the International Searching Authority dated Apr. 19, 2024.
(Continued)

*Primary Examiner* — Rochelle D Turchen
(74) *Attorney, Agent, or Firm* — Jacob M. Ward; Ward Law Office LLC

(57) ABSTRACT

Embodiments of the present disclosure may include a method for planning and performing an interventional procedure on a patient, the method including steps of providing an augmented reality system, a tracked instrument, a first image acquisition system, a second image acquisition system, and a computer system with a processor and a memory, the tracked instrument having a plurality of sensors to provide a tracked instrument dataset, the first image acquisition system, and the computer system in communication with the augmented reality system, the tracked instrument, the first image acquisition system, and the second image acquisition system. Embodiments may also include acquiring, by the first image acquisition system, the first holographic image dataset from the patient. Embodiments may also include acquiring, by the second image acquisition system, the second holographic image dataset from the patient.

20 Claims, 8 Drawing Sheets

(56) References Cited

U.S. PATENT DOCUMENTS

| | | |
|---|---|---|
| 2021/0093391 A1 | 4/2021 | Poltaretskyi et al. |
| 2021/0121237 A1 | 4/2021 | Fanson et al. |
| 2021/0151512 A1 | 5/2021 | Lee et al. |
| 2021/0298836 A1* | 9/2021 | Black .................... A61B 34/20 |
| 2022/0295033 A1 | 9/2022 | Quiles Casas |

OTHER PUBLICATIONS

Park, Brian, "HoloLens cryoablation planning", video, youtube.com, Feb. 10, 2018, https://www.youtube.com/watch?v=MeAvPxt3s_g.

Medtronic Minimally Invasive Therapies Group, "Emprint™ SX Ablation Platform with Thermosphere™ Technology", video, youtube.com, May 5, 2021, https://www.youtube.com/watch?v=SygBo9cLGmA&t=50s.

Ethicon, "Ablation Confirmation Software with the NeuWave Platform | Ethicon", video of webinar conducted by Dr. Lu in Nov. 2019, youtube.com, Oct. 7, 2022, https://www.youtube.com/watch?v=_TaC4S2tKqU.

* cited by examiner

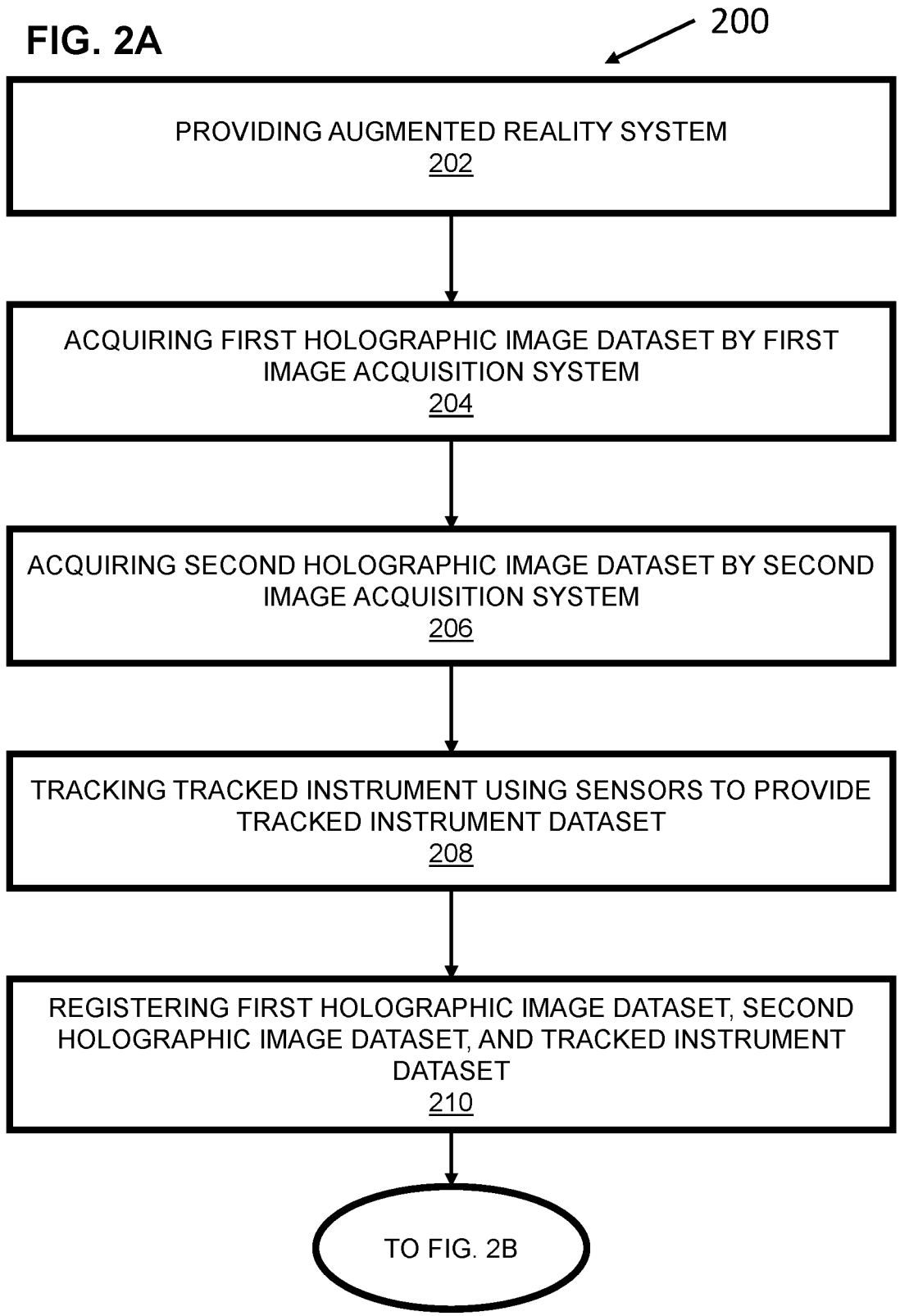

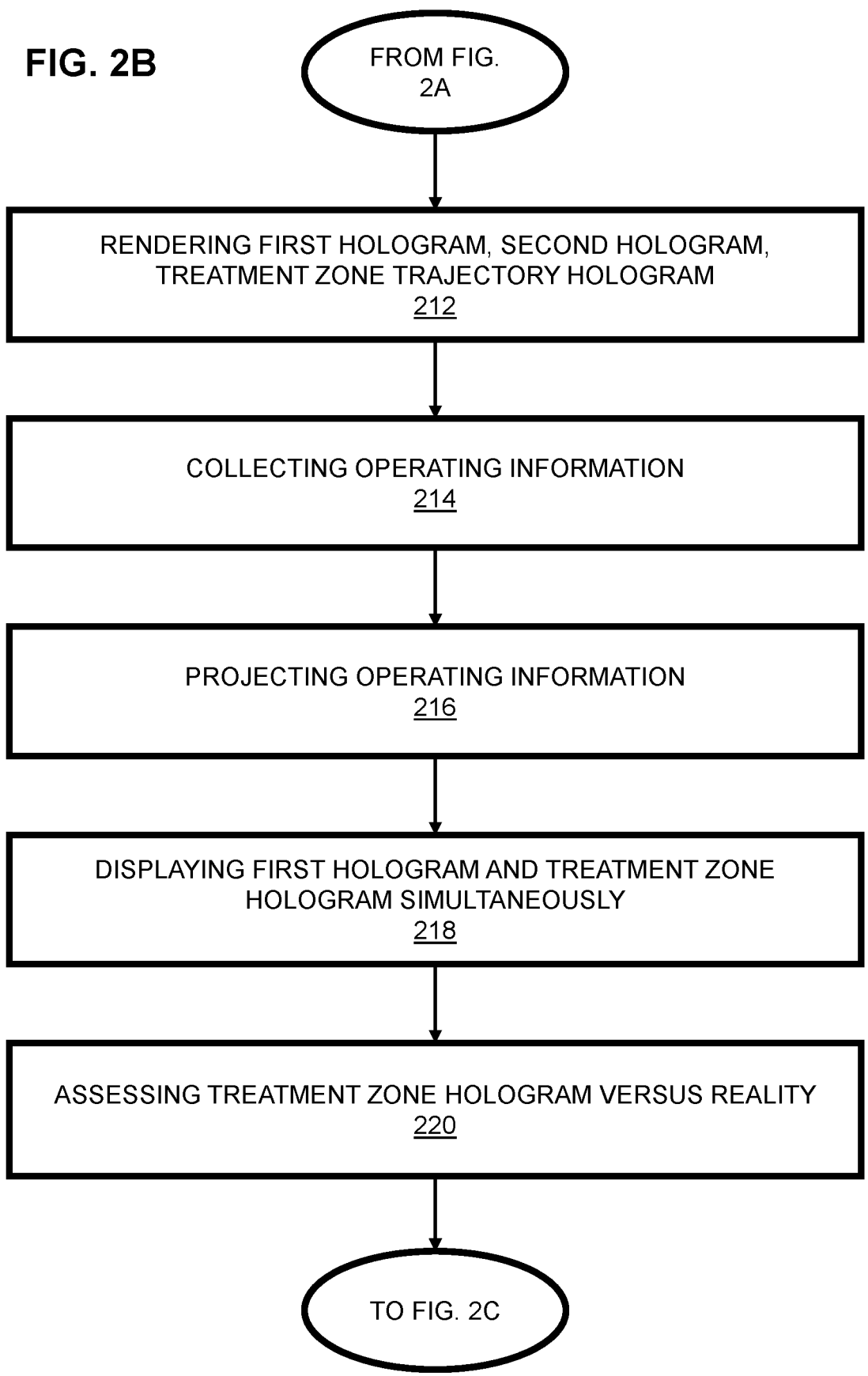

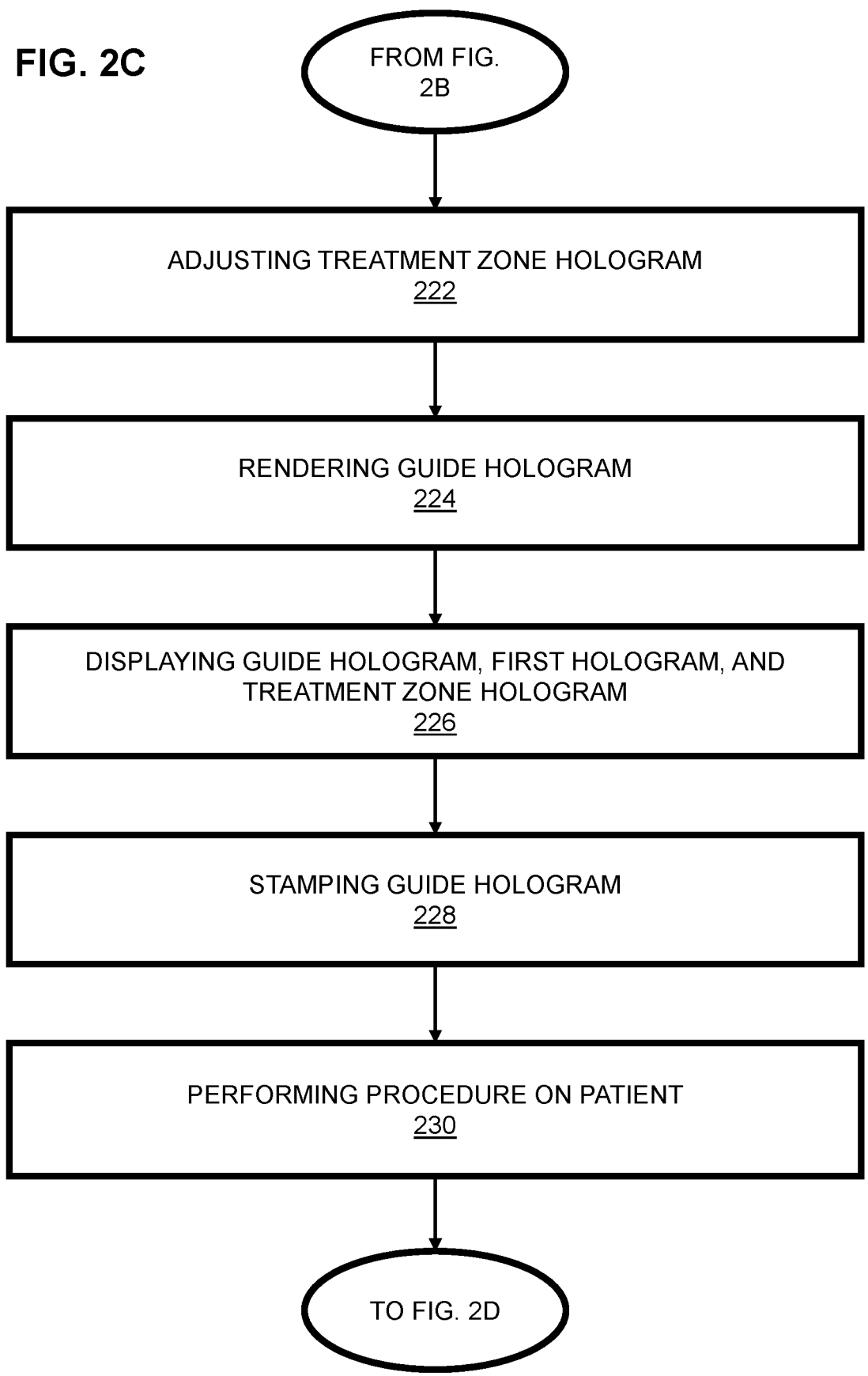

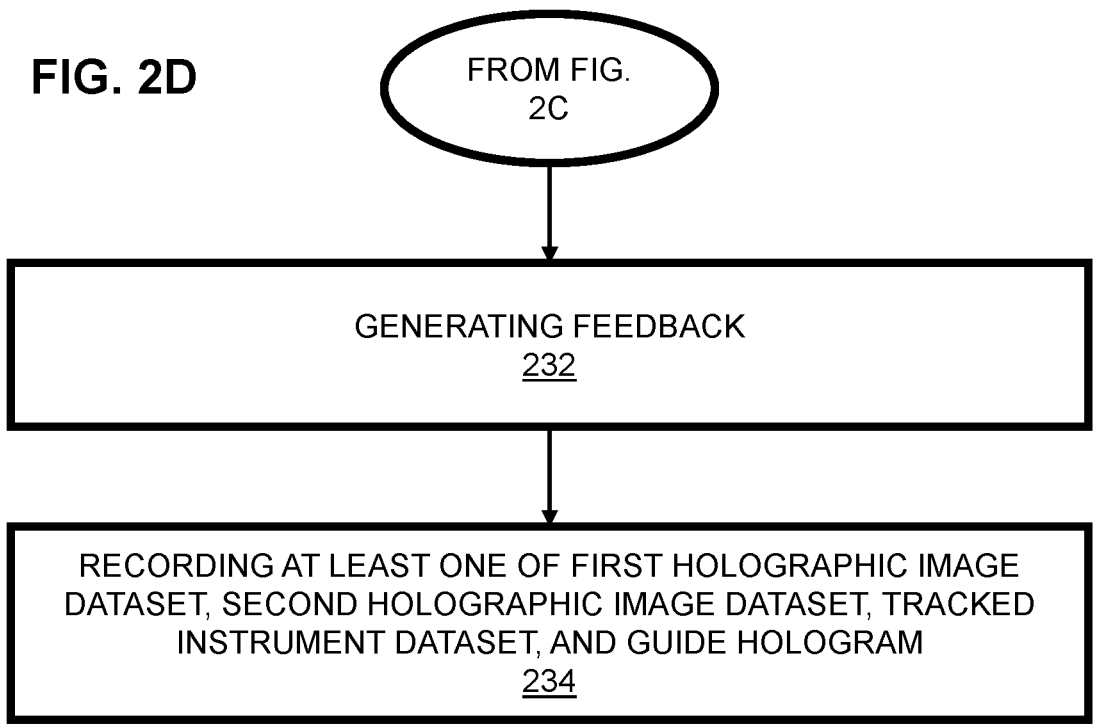

PLANNING AND PERFORMING THREE-DIMENSIONAL HOLOGRAPHIC INTERVENTIONAL PROCEDURES WITH HOLOGRAPHIC GUIDE

CROSS-REFERENCE TO RELATED APPLICATIONS

This application claims the benefit of U.S. Provisional Application No. 63/479,139, filed on Jan. 9, 2023. The entire disclosure of the above application is incorporated herein by reference.

FIELD

The present technology relates to holographic augmented reality applications and, more particularly, medical applications employing holographic augmented reality.

INTRODUCTION

This section provides background information related to the present disclosure which is not necessarily prior art.

Image-guided surgery has become standard practice for many different procedures. Image-guided surgery visually correlates intraoperative data with preoperative data. The use of image-guided surgeries has been shown to increase the safety and the success of these procedures. However, there are many known difficulties that may arise during image-guided surgeries. For instance, how the intraoperative data and preoperative is shown to the practitioner may directly correlate to the surgical performance of the practitioner. Typically, this information is shown on two dimensional (2D) displays that are positioned around a patient. Undesirably, this shifts the focus of the practitioner from the patient to the 2D displays. Also, this may place additional stress on the neck of the practitioner due to the practitioner having to constantly glance at the 2D display while performing the procedure.

Determining an optimal angle of instrument insertion during a surgical procedure may also be difficult because of how the intraoperative data and preoperative data is displayed. As mentioned previously, this data is typically shown in 2D, meaning the practitioner must mentally translate the position and the trajectory of the instrument relative to the data shown on the 2D display. This may undesirably lead to confusion and errors due to the position and trajectory of the instrument being poorly translated between 2D and the patient's body in three dimensions (3D).

Accordingly, there is a continuing need for visualization, guidance, and navigation methods and systems for procedures that involve holographic augmented reality, allowing the practitioner to view operating data and the patient within the same field of view.

SUMMARY

In concordance with the instant disclosure, ways of providing visualization, guidance, and navigation for a procedure that involves holographic augmented reality, allowing the practitioner to view operating data and the patient within the same field of view, have been surprisingly discovered.

Embodiments of the present disclosure may include a method for planning and performing an interventional procedure on a patient. The method may include providing an augmented reality system, a tracked instrument, a first image acquisition system, a second image acquisition system, and a computer system with a processor and a memory. The tracked instrument may have a plurality of sensors to provide a tracked instrument dataset. The computer system may be in communication with the augmented reality system, the tracked instrument, the first image acquisition system, and the second image acquisition system.

Embodiments may also include acquiring, by the first image acquisition system, the first holographic image dataset from the patient. Embodiments may also include acquiring, by the second image acquisition system, the second holographic image dataset from the patient. Embodiments may also include tracking, by the computer system, the tracked instrument using the plurality of sensors to provide a tracked instrument dataset.

Embodiments may also include registering, by the computer system, the first holographic image dataset, the second holographic image dataset, and the tracked instrument dataset with the patient. Embodiments may also include rendering, by the augmented reality system, a first hologram, a second hologram, a treatment zone hologram. Embodiment may include a plurality of holograms corresponding to a plurality of tracked instruments and treatment zones. Embodiments may also include adjusting, with the computer system, the treatment zone hologram.

Embodiments may also include rendering, by the augmented reality system, a guide hologram. Embodiments may also include performing, by the practitioner, the procedure on the patient while viewing the patient, the first hologram, and the guide hologram with the augmented reality system. In some embodiments, the practitioner may employ a guide hologram and the augmented reality system for placement of the tracked instrument during the procedure. A set of planned holographic needle guides and placement of the tracked instrument may be stored in a file for subsequent review and data mining after the procedure.

The augmented reality system may support more than one operator (each with a headset) to partition tasks or provide mentorship while performing the procedure, for example, where one operator is performing the procedure, and the other is adjusting ablation parameters such as time and duration of each applicator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2D are a flowchart illustrating a method for planning and performing an interventional procedure on a patient by a practitioner, according to an embodiment of the present disclosure;

DETAILED DESCRIPTION

Figure 1:
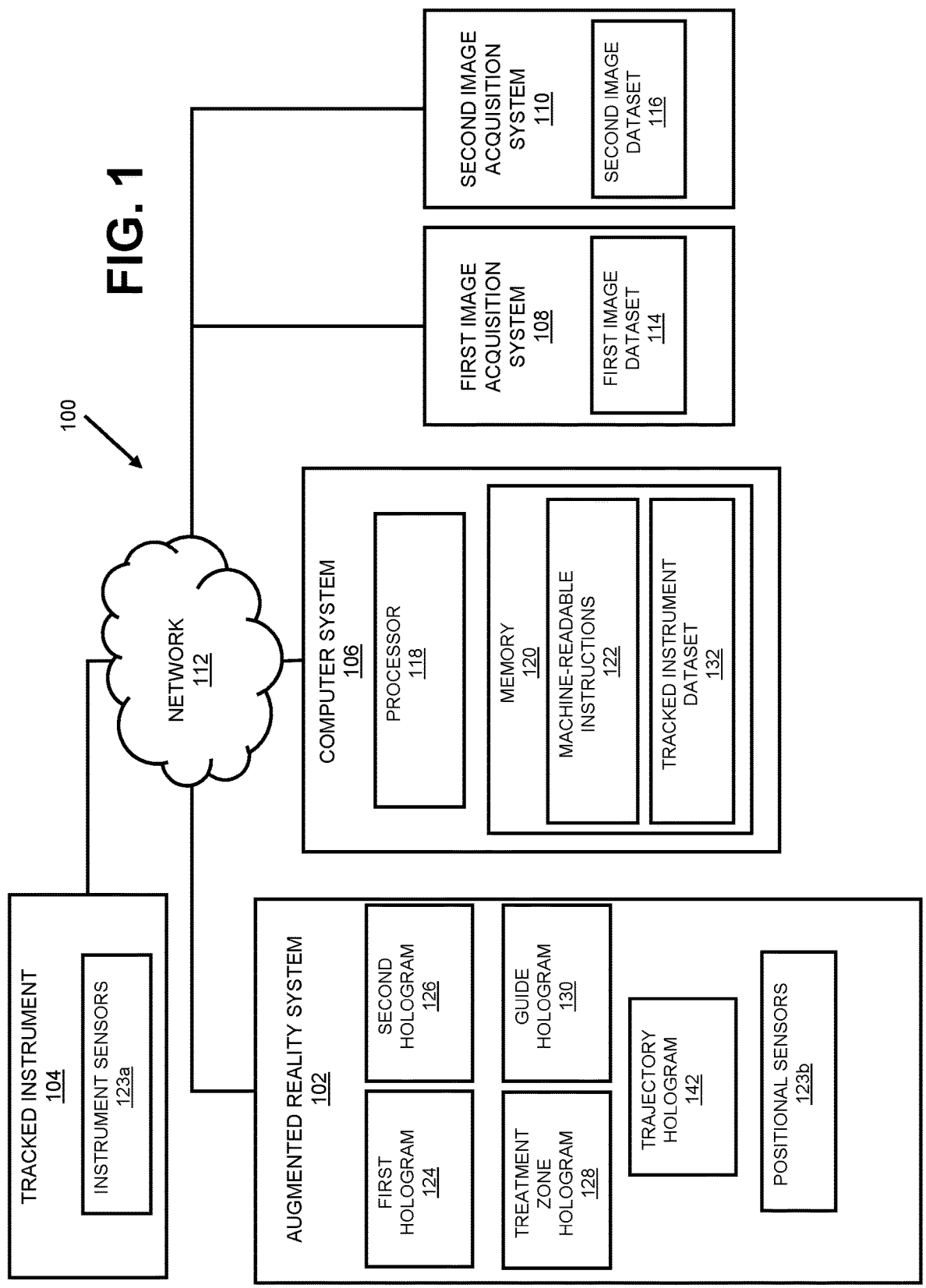
FIG. 1 is a block diagram illustrating a system, according to an embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature unless otherwise disclosed, and thus, the order of the steps may be different in various embodiments, including where certain steps may be simultaneously performed.

Unless otherwise defined, all technical terms used herein have the same meaning as commonly understood by one of ordinary skill in the art to which the present disclosure pertains.

As used herein, the terms "a" and "an" indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

As used herein, the term "percutaneous" refers to something that is made, done, or effected through the skin.

As used herein, the term "percutaneous medical procedure" refers to accessing the internal organs or tissues via needle-puncture of the skin, rather than by using an open approach where the internal organs or tissues are exposed (typically with a scalpel).

As used herein, the term "non-vascular" when used with "percutaneous medical procedure" refers to a medical procedure performed on any portion of the subject's body distinct from the vasculature that is accessed percutaneously. Examples of percutaneous medical procedures may include a biopsy, a tissue ablation, a cryotherapy procedure, a brachytherapy procedure, an endovascular procedure, a drainage procedure an orthopedic procedure, a pain management procedure, a vertebroplasty procedure, a pedicle/screw placement procedure, a guidewire-placement procedure, a SI-Joint fixation procedure, a training procedure, or the like.

As used herein, the terms "interventional device" or "tracked instrument" refers to a medical instrument used during the non-vascular percutaneous medical procedure.

As used herein, the term "tracking system" refers to something used to observe one or more objects undergoing motion and supply a timely ordered sequence of tracking data (e.g., location data, orientation data, or the like) in a tracking coordinate system for further processing. As an example, the tracking system may be an electromagnetic tracking system that may observe an interventional device equipped with a sensor-coil as the interventional device moves through a patient's body.

As used herein, the term "tracking data" refers to information recorded by the tracking system related to an observation of one or more objects undergoing motion.

As used herein, the term "tracking coordinate system" refers to a 3D Cartesian coordinate system that uses one or more numbers to determine the position of points or other geometric elements unique to the particular tracking system. For example, the tracking coordinate system may be rotated, scaled, or the like, from a standard 3D Cartesian coordinate system. As a non-limiting example, additional coordinate systems may be utilized such as, spherical, cylindrical, ellipsoidal, prolate spheroidal, oblate spheroidal, and quaternion coordinate systems.

As used herein, the term "head-mounted device" or "headset" or "HMD" refers to a display device, configured to be worn on the head, that has one or more display optics (including lenses) in front of one or more eyes. These terms may be referred to even more generally by the term "augmented reality system," although it should be appreciated that the term "augmented reality system" is not limited to display devices configured to be worn on the head. In some instances, the head-mounted device may also include a non-transitory memory and a processing unit. An example of a suitable head-mounted device is a Microsoft HoloLens®.

As used herein, the terms "imaging system," "image acquisition apparatus," "image acquisition system" or the like refer to technology that creates a visual representation of the interior of a patient's body. For example, the imaging system may be a computed tomography (CT) system, a fluoroscopy system, positron emission computed tomography, magnetic resonance imaging (MRI) system, an ultrasound (US) system including contrast agents and color flow doppler, or the like.

As used herein, the terms "coordinate system" or "augmented realty system coordinate system" refer to a 3D Cartesian coordinate system that uses one or more numbers to determine the position of points or other geometric elements unique to the particular augmented reality system or image acquisition system to which it pertains. For example, 3D points in the headset coordinate system may be translated, rotated, scaled, or the like, from a standard 3D Cartesian coordinate system.

As used herein, the terms "image data" or "image dataset" or "imaging data" refers to information recorded in 3D by the imaging system related to an observation of the interior of the patient's body. For example, the "image data" or "image dataset" may include processed two-dimensional or three-dimensional images or models such as tomographic images, e.g., represented by data formatted according to the Digital Imaging and Communications in Medicine (DICOM) standard or other relevant imaging standards.

As used herein, the terms "imaging coordinate system" or "image acquisition system coordinate system" refers to a 3D Cartesian coordinate system that uses one or more numbers to determine the position of points or other geometric elements unique to the particular imaging system. For example, 3D points and vectors in the imaging coordinate system may be translated, rotated, scaled, or the like, to the Augmented Reality system (head mounted displays) 3D Cartesian coordinate system.

As used herein, the terms "hologram", "holographic," "holographic projection", or "holographic representation" refer to a computer-generated image stereoscopically projected through the lenses of a headset. Generally, a hologram may be generated synthetically (in an augmented reality (AR)) and is not a physical entity.

As used herein, the term "physical" refers to something real. Something that is physical is not holographic (or not computer-generated).

As used herein, the term "two-dimensional" or "2D" refers to something represented in two physical dimensions.

As used herein, the term "three-dimensional" or "3D" refers to something represented in three physical dimensions. An element that is "4D" (e.g., 3D plus a time and/or motion dimension) would be encompassed by the definition of three-dimensional or 3D.

As used herein, the term "integrated" may refer to two things being linked or coordinated. For example, a coil-sensor may be integrated with an interventional device.

As used herein, the term "real-time" refers to the actual time during which a process or event occurs. In other words, a real-time event is done live (within milliseconds so that results are available immediately as feedback). For example, a real-time event may be represented within 100 milliseconds of the event occurring.

As used herein, the terms "subject" and "patient" may be used interchangeably and refer to any vertebrate organism.

As used herein, the term spatial "registration" refers to steps of transforming virtual representation of tracked devices—including holographic guides, applicators, and ultrasound image stream—and additional body image data for mutual alignment and correspondence of said virtual devices and image data in the head mounted displays coordinate system resulting in a stereoscopic holographic projection display of images and information relative to a body of a physical patient during a procedure, for example, as further described in U.S. Patent Application Publication No. 2018/0303563 to West et al., and also applicant's co-owned U.S. patent application Ser. No. 17/110,991 to Black et al. and U.S. patent application Ser. No. 17/117,841 to Martin III et al., the entire disclosures of which are incorporated herein by reference.

With reference now to FIGS. 1-6, ways of planning and performing an interventional procedure on a patient by a practitioner can employ various system configurations and can use various combinations of method steps. It should be appreciated that the holographic augmented reality visualization and guidance system 100 of the present disclosure may be utilized to plan and perform an interventional procedure on the patient. The holographic augmented reality visualization, and guidance system 100 may be utilized in an interventional procedure where a predetermined or planned treatment zone may be identified. As a non-limiting example, the holographic augmented reality visualization and guidance system 100 may be utilized in the treatment of a solid and localized tumor. The treatment may include various types of treatments affecting various types of treatment zones. Examples of treatments include delivery of various types of energy, including changes in thermal energy, radiofrequency energy, and electromagnetic energy. Particular examples include energy (thermal and non-thermal) ablation; e.g., application of heat or by freezing (e.g., cryoablation), irreversible electroporation, and pulsed wave ablation. Other treatments include delivery of a therapeutic material or device, such as an active pharmaceutical ingredient, chemotherapy, radiation seeds, or barrier material.

As shown in the depictions of systems of the present disclosure, shown in FIGS. 1 and 3-5, a holographic augmented reality visualization and guidance system 100 for performing an interventional procedure on a patient may include an augmented reality system 102, a tracked instrument 104, a computer system 106, and a first image acquisition system 108. In certain examples, the holographic augmented reality visualization and guidance system 100 may further include a second image acquisition system 110, also shown in FIG. 1. Each of the augmented reality system 102, the tracked instrument 104, the first image acquisition system 108, and the second image acquisition system 110 may be selectively or permanently in communication with the computer system 106, for example, via a computer network 112. Other suitable instruments, tools, equipment, sub-systems, and the like for use with the holographic augmented reality visualization and guidance system 100, as well as other network means including wired and wireless means of communication between the components of the holographic augmented reality visualization and guidance system 100, may also be employed by the skilled artisan, as desired.

The tracked instrument 104 may be an interventional device that is sensorized so that both location and orientation of the tracked instrument 104 may be determined by the computer system 106. The system 100 may have a plurality of sensors 123 and each of the sensors may be in communication with or otherwise detectable by the computer system 106. In particular, the tracked instrument 104 may have instrument sensors 123a and each of the sensors may be in communication with or otherwise detectable by the computer system 106. In certain embodiments, the augmented reality system 102 can include the plurality of sensors 123, such as augmented reality sensors 123b. In certain examples, the sensors 123 may be part of an electromagnetic (EM) tracking system that may be part of and/or used by the computer system 106 to detect the location and orientation of a physical tracked instrument 104. For example, the sensors may include one or more sensor-coils. The computer system 106 may detect the one or more sensor-coils and provide tracking data (e.g., with six degrees of freedom) in response to the detection. For example, the tracking data may include real-time 3D position data and real-time 3D orientation data. The tracking system of the computer system 106 may also detect coil-sensors that are not located on the physical interventional device (e.g., located on fiducial markers or other imaging targets).

Other suitable tracking systems such as optical tracking systems used in conjunction with the augmented reality system 102 and the computer system 106 are specifically contemplated. Embodiments where the tracked instrument 104 may communicate by transmission wirelessly or through a wired connection with the augmented reality system 102 and the computer system 106 are further contemplated. It should also be appreciated that a skilled artisan may employ different types of positional sensors 123 as desired. Further, a skilled artisan may utilize different types of tracking systems within the scope of the present disclosure, as desired.

With renewed reference to FIG. 1, the first image acquisition system 108 may be configured to acquire a first image dataset 114 from the patient. In particular, the first image acquisition system 108 may be configured to acquire the first holographic image dataset 114 from the patient in a preoperative manner. In certain embodiments, the first image acquisition system 108 is one of a magnetic resonance imaging (MRI) apparatus and a computerized tomography (CT) apparatus. Other suitable types of instrumentation for the first image acquisition system 108 may also be employed, as desired. In another embodiment, the first image acquisition system 108 may be configured to acquire the first holographic image dataset 114 from the patient in a perioperative feedback loop as a means of real-time intraoperative improvement.

The first holographic image dataset 114 can include information related to the patient obtained prior to the medical procedure, for example, using the first image acquisition system 108 as well as data obtained, processed, and/or annotated from a variety of sources. Embodiments of the first holographic image dataset include various images, composite images, annotated images, or portions of the anatomical site of the patient. Certain nonlimiting examples of the first holographic image dataset include static images or recordings from a transesophageal echocardiogram, a transabdominal echocardiograph, a transthoracic echocardiogram, a computerized tomography (CT) scan, a magnetic resonance imaging (MRI) scan, or an X-ray. It should be appreciated that the preoperative data can include information from other diagnostic medical procedures, imaging modalities, and modeling systems, as desired.

Likewise, the second image acquisition system 110 is configured to acquire a second image dataset 116 from the patient. In particular, the second image acquisition system 110 may be configured to acquire the second holographic image dataset 116 from the patient in an intraoperative manner, and most particularly in real-time as the procedure is being undertaken. In certain embodiments, the second image acquisition system 110 may be an ultrasound imaging apparatus. Other suitable types of instrumentation and modalities for the second image acquisition system 110 may also be employed, as desired.

Although use of both the first image acquisition system 108 and the second image acquisition system 110 is shown and described herein, embodiments in which only one or the other of the first image acquisition system 108 and the second image acquisition system 110 is employed, are considered to be within the scope of the present disclosure.

With continued reference to FIG. 1, the computer system 106 of the present disclosure may have at least one processor 118. The one or more processors 118 may perform functions associated with the operation of the holographic augmented reality visualization and guidance system 100. The one or more processors 118 may be any type of general or specific purpose processor. In some cases, multiple processors 118 may be utilized according to other embodiments. In fact, the one or more processors 118 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as non-limiting examples.

The computer system 106 may have at least one memory 120 on which tangible, non-transitory, machine-readable instructions 122 are stored. The memory 120 may be one or more memories and of any type suitable to the local application environment and may be implemented using any suitable volatile or nonvolatile data storage technology such as a semiconductor-based memory device, a magnetic memory device and system, an optical memory device and system, fixed memory, and removable memory. For example, the memory 120 may consist of any combination of random access memory (RAM), read only memory (ROM), static storage such as a magnetic or optical disk, hard disk drive (HDD), or any other type of non-transitory machine or computer readable media. The instructions stored in the memory 120 may include program instructions or computer program code that, when executed by one or more processors 118, enable the holographic augmented reality visualization and guidance system 100 to perform tasks as described herein.

The machine-readable instructions 122 stored by the memory 120 may include modules. The modules may be implemented as one or more of functional logic, hardware logic, electronic circuitry, software modules, and the like. The modules may include one or more of an augmented reality system module, an image acquiring module, an instrument tracking module, an image dataset registering module, a hologram rendering module, an image registering module, a trajectory hologram rendering module, and/or other suitable modules, as desired.

The computer system 106 may be in communication with the augmented reality system 102, the tracked instrument 104, and the first image acquisition system 108, and the second image acquisition system 110, for example, via the network 112, and may be configured by the machine-readable instructions 122 to operate in accordance with a method 200 as described herein. The computer system 106 may be separately provided and spaced apart from the augmented reality system 102 or may be provided together with the augmented reality system 102 as a singular one-piece unit, as desired.

It should be appreciated that the network 112 of the holographic augmented reality visualization and guidance system 100 may include a radio access network, such as LTE or 5G, a local area network (LAN), a wide area network (WAN) such as the Internet, or wireless LAN (WLAN), as non-limiting examples. It will be appreciated that this is not intended to be limiting, and that the scope of this disclosure includes implementations in which one or more computing platforms of the holographic augmented reality visualization and guidance system 100 may be operatively linked via some other communication coupling. The one or more one or more computing platforms may be configured to communicate with the networked environment via wireless or wired connections. In addition, in an embodiment, the one or more computing platforms may be configured to communicate directly with each other via wireless or wired connections. Examples of one or more computing platforms may include, but is not limited to, smartphones, wearable devices, tablets, laptop computers, desktop computers, Internet of Things (IoT) device, or other mobile or stationary devices such as standalone servers, networked servers, or an array of servers.

The augmented reality system 102 may be configured to render a plurality of holograms in accordance with the method 200 of the present disclosure. In particular, the augmented reality system 102 may be a mixed reality (MR) display such as a MR smart glasses or a MR head-mounted display. Nonlimiting examples of the augmented reality system 102 include the Magic Leap One® or the Microsoft HoloLens®. It should be appreciated that other types of MR displays may be used for the augmented reality system 102, as long as they are capable of superimposing computer-generated imagery over real-world objects. Additionally, although the augmented reality system 102 is described primarily herein as being a head-mounted display, it should be understood that other types of display that are not head-mounted but which are capable of generating and superimposing the holograms over the real-world views may also be employed, as desired.

It should be appreciated that in instances where the augmented reality system 102 does not contain the computer system 106, the augmented reality system 102 may further include an additional non-transitory memory and a processing unit (that may include one or more hardware processors) that may aid in the rendering or generation of holograms. The augmented reality system 102 may also include a camera to record one or more images, one or more image-generation components to generate/display a visualization of the holograms, and/or other visualization and/or recording elements. Recording can include tracking one or more steps or actions of a medical procedure, movement of one or more surgical instruments, and the anatomy of a patient (pre- and post-intervention) in real-time within a three-dimensional space.

In yet further examples, it should be appreciated that the augmented reality system 102 may also include a plurality of positional sensors 123*b*. The plurality of positional sensors 123*b* of the augmented reality system 102 can be configured to determine various positional information for the augmented reality system 102, such as the approximated position in three-dimensional (3D) space, the orientation, angular velocity, and acceleration of the augmented reality system 102. In particular, it should be understood that this and the said registration methods allow the holographic imagery to be accurately displayed in co-registration with imaged anatomy in the field of view of the practitioner, in operation.

Nonlimiting examples of the plurality of positional sensors 123*b* include accelerometers, gyroscopes, electromagnetic sensors, and optical tracking sensors. It should further be appreciated that a skilled artisan may employ different types and numbers of the plurality of positional sensors 123*b* of the augmented reality system 102, for example, as required by the procedure or situation within which the augmented reality system 102 is being used.

The augmented reality system 102 may be configured to generate a plurality of holograms for viewing by the practitioner throughout planning and performing the interventional procedure. As shown in FIG. 1, for example, the holograms generated by the augmented reality system 102 may include a first hologram 124, a second hologram 126, an ablation treatment zone hologram 128, and an applicator guide hologram 130. The first hologram 124 generated by the augmented reality system 102 may be based on the first holographic image dataset 114 from the patient. The second hologram 126 generated by the augmented reality system 102 may be based on the second holographic image dataset 116. The treatment zone hologram 128 may be visualized in relationship to a tracked instrument dataset 132, which may be either manually or automatically selected and stored on the memory 120 of the computer system 106, as described further herein. The applicator guide hologram 130 may be generated within the treatment zone at an adjustable depth from the applicator tip, as described further herein.

It should be appreciated that there may be a plurality of treatment zones and, therefore, a plurality of treatment zone holograms 128. The plurality of treatment zone holograms 128 may be intersecting. As a non-limiting example, the plurality of treatment zones could result in a mickey mouse shape treatment zone such that a first treatment zone hologram shaped as a sphere, a second treatment zone hologram shaped as a sphere, and a third treatment zone hologram shaped as a sphere intersect and overlap to create a uniquely shaped polygon. With reference to the above described example, the resulting polygon may include three different lobes resulting from three tracked instruments of varying types simultaneously or one tracked instrument multiple times that includes different settings and different trajectories that are all displayed in unique ways (colors, textures, data values overlaid, heat map gradation for the actual vs. predicted differences, etc.).

Figure 5:
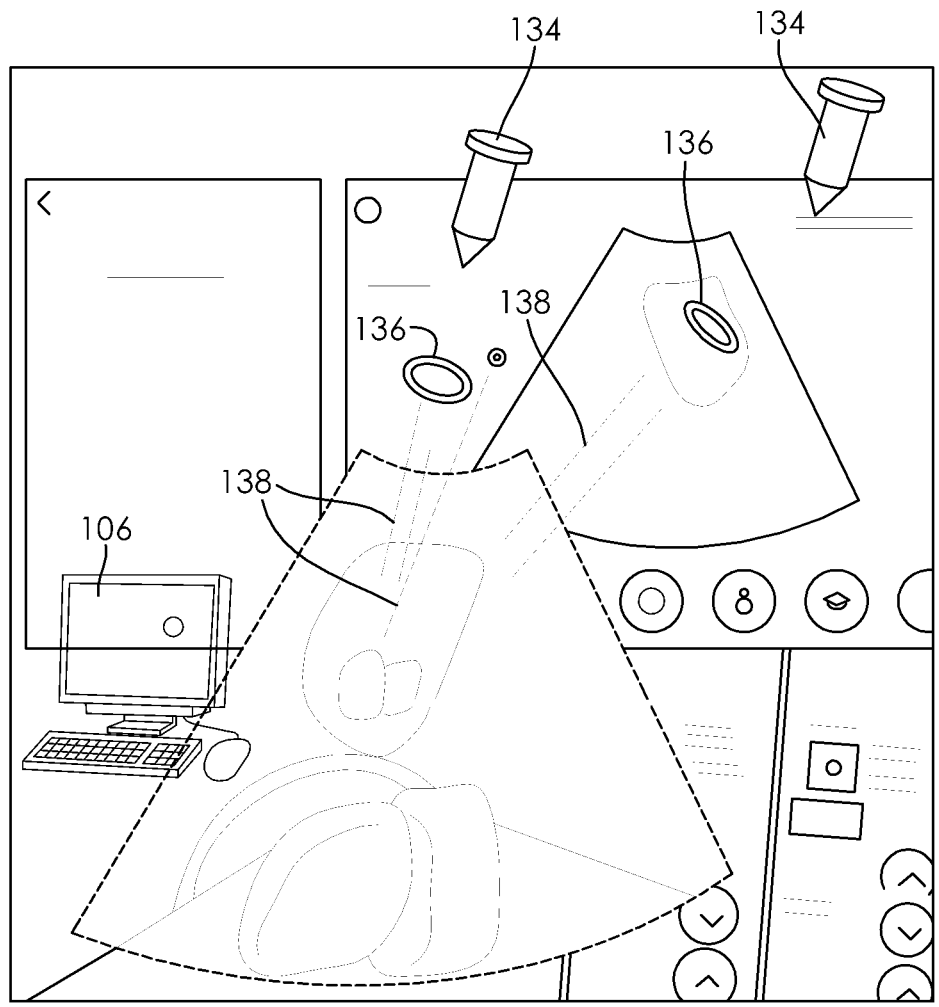
FIG. 5 is an image depicting further use of the system including multiple guide holograms, according to an embodiment of the present disclosure.

The ablation treatment zone hologram 128 may be generated using the augmented reality system 102 and the computer system 106. The treatment zone hologram 128 may provide a visualization to the practitioner where the treatment will be applied by the tracked instrument 104. The practitioner may visualize the first hologram 124 and the treatment zone hologram 128 simultaneously to visualize the predicted effect of the treatment or procedure on the anatomy of the patient. Utilizing the computer system 106, the practitioner may adjust the predetermined treatment zone. The augmented reality system 102 may then accordingly adjust the treatment zone hologram 128, which may allow the practitioner to visualize, in real-time, the effects of the treatment or procedure. The augmented reality system 102 and the computer system 106 may then plan and generate the guide hologram 130 based on the treatment zone selected by the practitioner. The guide hologram 130 may assist the practitioner with 3D placement of the tracked instrument 104 such that the predicated treatment is applied according to the treatment zone hologram 128. The guide hologram 130 can include at least one of a guide hub 134, a guide hoop 136, and a guide path 138, as shown in FIG. 5. The guide hub 134 may provide an initial guide for the practitioner to initially align the tracked instrument 104 during the procedure. The guide hub 134 stamped in a particular location may also provide the practitioner with an indication of the depth that the tracked instrument 104 should be inserted into patient during the procedure such that, in operation, once the tracked instrument 104 aligns with the guide hub 134, the tracked instrument 104 is at the desired depth. The guide hoop 136 may provide the practitioner with a desired angle and further path guidance for which the tracked instrument 104 may be inserted into the patient during the procedure. The guide path 138 may provide a more detailed and thorough path for the practitioner to follow with the tracked instrument 104 during the procedure allowing for the practitioner to assess the angle, location, and depth that the tracked instrument 104 should follow during the procedure. Together, the guide hub 134, the guide hoop 136, and the guide path 138 may provide a trajectory for the practitioner to follow during the procedure.

Figure 6:
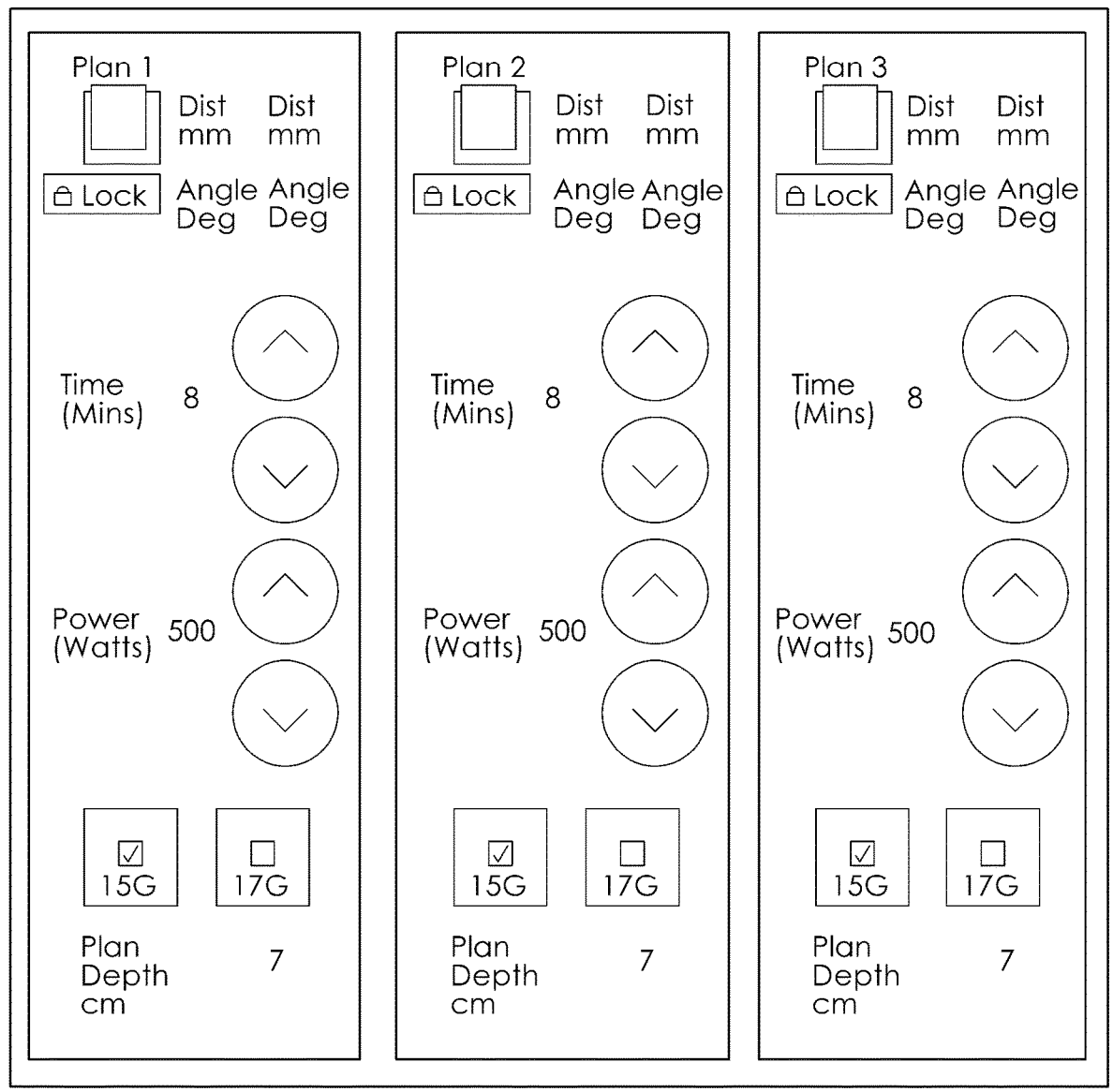
FIG. 6 is an image depicting ablation parameter settings as utilized by a practitioner.

It should be noted that the practitioner may select parameters to perform the ablation during the procedure, as shown in FIG. 6. The practitioner may modify the ablation time as well as the ablation power for each of the guide holograms 130 generated. Further, the ablation portions may be represented in the holograms by changing colors, patterns, sizes of ablation zones, or other visual cues or indicia representative of time, power, etc. In certain embodiments, the ablation zones may show a transient element as they grow. A skilled artisan can select suitable ablation time and ablation power within the scope of the present disclosure.

In certain embodiments, the holographic augmented reality visualization and guidance system 100 may include a plurality of tracked instruments 104. The use of multiple tracked instruments may allow the practitioner, or multiple practitioners, to sequentially or simultaneously treat irregularly shaped and/or intersecting treatment zones. The multiple tracked instruments 104 may allow the practitioner(s) to fully realize a predetermined 3D margin zone, especially where there are changes in tumor characteristics, healthy tissues, structures, voids, or fluid from hydrodissection. Where multiple tracked instruments are used, there may be a complex interaction of the location, power, time, etc. when there is an overlap in the treatment zone for each of the tracked instruments 104. Advantageously, the use of multiple tracked instruments 104 may allow for the avoidance of adjacent structures by utilizing multiple simultaneous trajectories. A practitioner can select a suitable number of tracked instruments 104 that are appropriate for a given procedure, as desired.

The augmented reality system 102 may further be configured, to show a plurality of operating information or details to the practitioner in addition to rendering or generating the various holograms. For example, the augmented reality system 102 may project the plurality of operating information in alignment with real-world objects, such as the patient. The operating information may include real-time navigation instructions or guidance for the trajectory to be employed, for example. It should be appreciated that the augmented reality system 102 may project the plurality of operating information over various real-world objects such as the tracked instrument 104, as well as over the various holograms rendered, as desired.

Desirably, this generating of the operating information or details allows the practitioner to simultaneously view the patient and the plurality of operating information is the same field of view. Also, the generating of the operating information or details together with the various holograms permits the practitioner to plan, size, or pre-orient the tracked instrument 104 in operation and then align the tracked instrument 104 with a particular planned trajectory.

The computer system 106 may be in communication with the augmented reality system 102 and the tracked instrument 104. The computer system 106 may be configured to store and generate the plurality of operating information, either thorough manual intervention by the practitioner or other medical professionals, or automatically based on the machine-readable instructions 122 encoded onto the memory 120. For example, the plurality of operating information may be generated in the augmented reality system 102 depending on a sensor-determined position or orientation of the tracked instrument 104, such as by algorithms, artificial intelligence (AI) protocols, or other practitioner-inputted data or thresholds.

In addition, the computer system 106 may be further configured to permit the practitioner to selectively adjust the plurality of operating information in real-time. In addition, the practitioner may be able to decide which of the plurality of operating data is actively being shown to the practitioner. It should be appreciated that other settings and attributes of the plurality of operating information may be adjusted by practitioner in real-time, within the scope of this disclosure.

In particular, it should be understood that the augmented reality system 102 of the present disclosure advantageously permits the practitioner to perform the method 200 for performing an interventional procedure on the patient while viewing the patient and the holograms described herein with the augmented reality system 102. Likewise, the practitioner is advantageously permitted to employ the augmented reality system 102 for at least one of visualization, guidance, and navigation of the tracked instrument 104 during the interventional procedure, as described further herein with respect to the method 200 of the disclosure.

Figure 3:
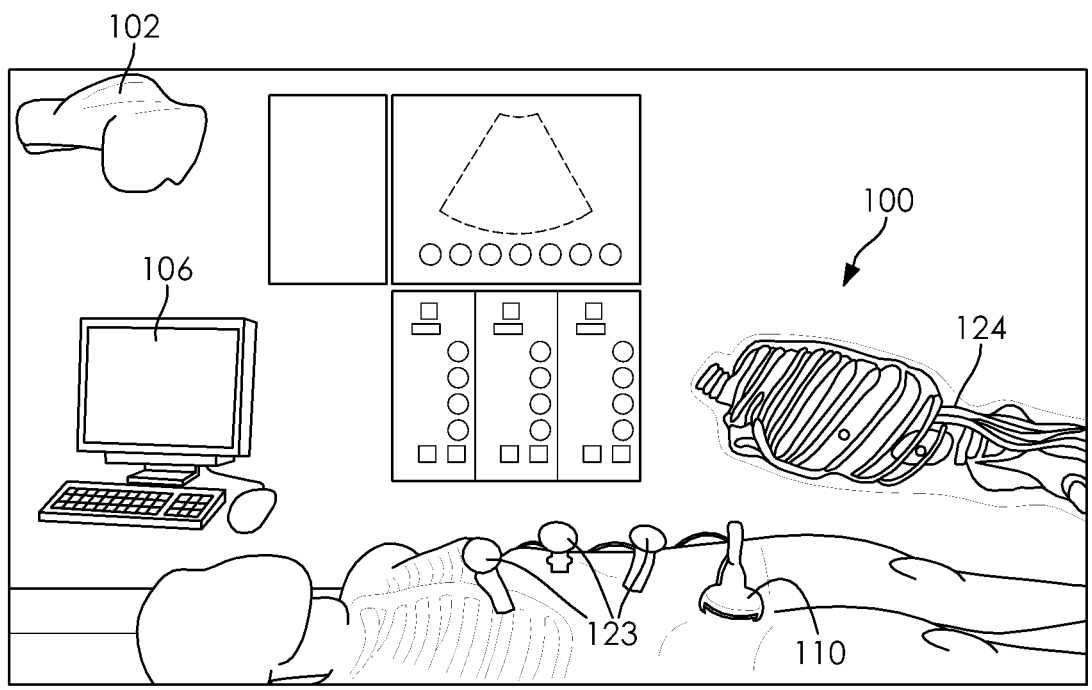
FIG. 3 is a system overview depicting an augmented reality system, a computer, an image acquisition system, a hologram, and a patient.

With reference to FIG. 3, an overview of the holographic augmented reality visualization and guidance system 100 is shown. In operation, the practitioner may view the patient and the first hologram 124 via the augmented reality system 102. As described herein, the augmented reality system 102 and tracked instrument 104 may utilize the plurality of sensors 123. The practitioner may also utilize the second image acquisition system 110 during the procedure to collect the second holographic image dataset 116 intraoperatively.

FIGS. 2A-2D illustrate an example flow diagram of the method 200, according to one embodiment of the present disclosure. The method 200 may include a step 202 of providing the holographic augmented reality visualization and guidance system 100 as described herein. In a step 204, the method 200 may then include acquiring, by the first image acquisition system 108, the first holographic image dataset 114 from the patient and optionally in a step 206, acquiring, by the second image acquisition system 110, the second holographic image dataset 116 from the patient. In certain examples, the first holographic image dataset 114 may include an area of the anatomy of the patient to be treated. The method 200 may include a step 208 of tracking, by the computer system 106, the tracked instrument 104 using the plurality of sensors 132a to provide a tracked instrument dataset 132. The method 200 may then include a step 210 of co-registering, by the computer system 106, the first holographic image dataset 114, the second image dataset 116, and a tracked instrument dataset 132 for projection with the physical patient.

In a step 212, the method 200 may then include rendering, by the augmented reality system 102, the first hologram 124 based on the first holographic image dataset 114 from the patient for viewing by a practitioner, the second hologram 126 based on the second holographic image dataset 116, and the treatment zone hologram 128 based on the tracked instrument dataset 132, for viewing by a practitioner.

The method 200 may include a step 214 of collecting, by the computer system 106, operating information or details to provide to the practitioner. In a step 216, the augmented reality system 102 may project the plurality of operating information in alignment with real-world objects, such as the patient. The operating information may include real-time navigation instructions or guidance for the trajectory to be employed, for example. It should be appreciated that the augmented reality system 102 may project the plurality of operating information over various real-world objects such as the tracked instrument 104, as well as over the various holograms rendered, as desired.

The method may include a step 218 of displaying the first hologram 124 and the treatment zone hologram 128 simultaneously. In this way, the practitioner is able to visualize the predicted effect of the treatment or procedure on the anatomy of the patient and in a step 220, may assess the treatment zone versus reality.

The method may include a step 222 of adjusting, with the computer system, the treatment zone hologram 128. The practitioner may adjust the trajectory of the treatment zone hologram 128 in relation to the first hologram 124. When the practitioner is satisfied with the placement of the treatment zone hologram 128, the practitioner may use a voice command or hand gesture, or other operator input provided to the augmented reality system to stamp or otherwise lock in the planned trajectory, depth, and predictive treatment zone. The method may include a step 224 of rendering the applicator guide hologram 130 based on the selected treatment zone which may include parameters of the predictive zone such a time and duration of the treatment if applicable. Depending on the tumor shape and volume to be treated, the practitioner may repeat the steps 222, 224 until the entire treatment region is covered by the treatment zone hologram 128.

Figure 4:
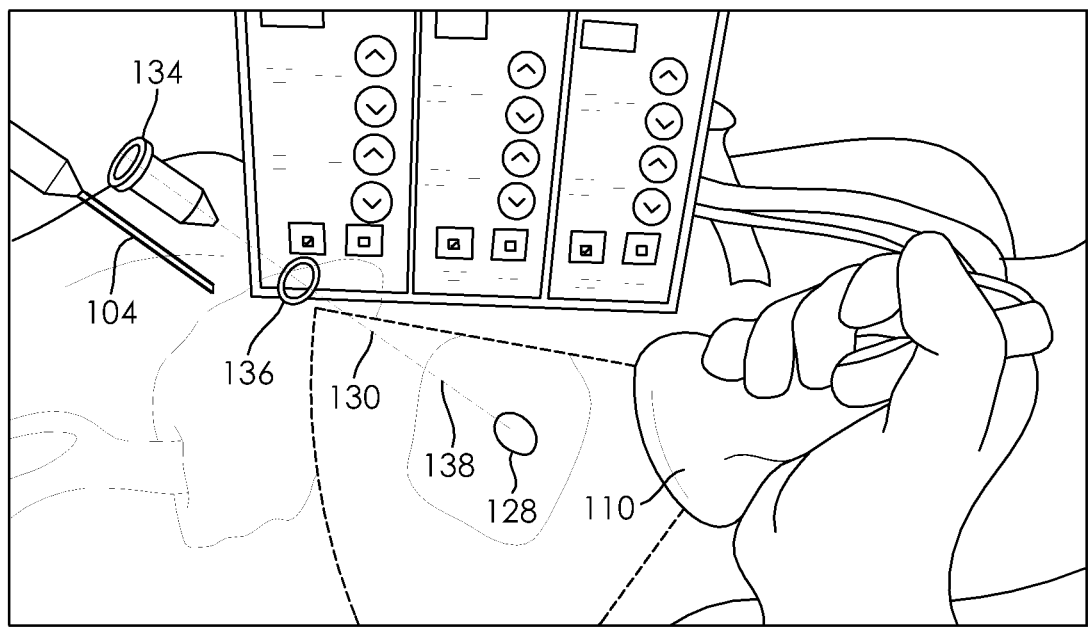
FIG. 4 is an image depicting further use of the system including the use of a guide hologram, according to an embodiment of the present disclosure.

The method 200 may then include a step 226 of displaying the guide hologram 130, the first hologram 124, and the treatment zone hologram 128 simultaneously. As described above, the practitioner is able to visualize the predicted effect of the treatment or procedure on the anatomy of the patient and may determine if the guide hologram 130 requires adjustment. The method 200 may include a step 228 of stamping, by the tracked instrument, the holographic guide to be viewed within the augmented reality system. The operator may stamp multiple holographic applicator guides based on the trajectory of one or more tracked instruments. Each holographic guide provides a planned trajectory, including but not limited to the guide hub 134, the guide path 138, the guide hoop 136, and the like, aligned with the tracked instrument at the time of stamping the holographic guide, as shown in FIG. 4. Planning holographic applicator guides in registration with tracked live ultrasound and tomographic image data set facilitates the avoidance of critical structures such as blood vessels and nearby organs during treatment. Placement of the holographic applicator guide may be facilitated by image-based holographic registered to the tracked instrument those derived from pre-procedural tomographic imaging, including but not limited to, segmented structures and tumors, anatomical planes, or multiplanar images co-planar with the tracked ultrasound image. The three anatomic planes derived from tomographic imaging may be updated with adjustment of the tracked instrument 104, so their common point is congruent with the planned ablation zone center point, the tip of the tracked instrument, or other point of interest in head mounted display coordinates to assist placement of planned ablation zones.

The method 200 may then include in a step 230 of performing, by the practitioner, the interventional procedure on the patient while viewing the patient and the first hologram 124, and the guide hologram 130, with the augmented reality system 102. Under the step 230, the practitioner employs the augmented reality system 102 for placement of the tracked instrument 104 during the procedure.

The method may include a step 232 of recording, using the computer system, a member selected from a group consisting of: the first holographic image dataset, the second holographic image dataset, the tracked instrument dataset, the guide hologram, and combinations thereof. Recording portions of the procedure along with any combination of datasets can allow for practitioners to learn from the procedure and implement changes in real-time or with respect to future procedures.

The method may include step 234 of generating, by the augmented reality system, a feedback based on the first holographic image dataset, the second holographic image dataset, the tracked instrument dataset, and a step 232. Real-time feedback can assist practitioners with implementing procedural modifications during the procedure itself, thereby providing a more efficient and effective procedure. Visual, auditory, or numerical holographic feedback is provided to assist with the alignment of the tracked instrument with the respective holographic applicator guide. The correspondence between tracked instrument and holographic guide may be indicated with holographic ablation zone color, texture, tag, or the like. The holographic ablation zone of the tracked instrument may be represented in relation to the tip of the tracked instrument. The tracked instrument may then be advanced to a planned depth such the holographic ablation zones of the tracked and stamped guide are congruent. The planned depth of the holographic applicator guide may be adjusted to intersect the tracked ultrasound image in the out-of-plan ultrasound transducer position and may be subsequently adjusted proximally or distally with voice commands of the augmented reality system or another operator input method associated with the augmented reality system in the in-plane or out-of-plane ultrasound method. Multiple separate tracked instruments may be inserted and placed as a set after planning a set of corresponding holographic applicator guides, whereby the coalescence of multiple zones of planned ablation zone conforms to the tumor or target tissue which is important for tumor that cannot.

After treatment, additional imaging is performed, often with a contrast agent to monitor the effect of the treatment. The updated images for monitoring the actual treatment or lack thereof are loaded to the compute system and registered for visualization with reference images and the tracked ultrasound. Additional holographic applicator guides followed by tracked instruments may then be utilized to achieve the end-point of treating and 3D visualizing the tumor with a sufficient 3D margin, typically 5 mm or the like. Methods to enable visualization of overlapping holograms based on fused imaging data and predictive ablations zone including use of intersecting contours of tomographic segmentation results on the live ultrasound image, use of wire frame shading models to visualize the 3D predictive ablation zone, and switching holograms on and off using voice commands or another AR UX method such as hand gestures.

In further embodiments, the plurality of operating information includes fused preoperative and intraoperative data. The preoperative and intraoperative data is fused in such a way to synergistically combine the advantages of each imaging modality. In some instances, the fusion may be refined manually after the fusion is done by the computer system 106, for example, using at least one of a plurality of algorithms set forth in the machine-readable instructions 122 or via artificial intelligence (AI).

While certain representative embodiments and details have been shown for purposes of illustrating the invention, it will be apparent to those skilled in the art that various changes may be made without departing from the scope of the disclosure, which is further described in the following appended claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods may be made within the scope of the present technology, with substantially similar results.

What is claimed is:

1. A method for planning and performing an interventional procedure on a patient by a practitioner, the method comprising:
    providing an augmented reality system, a tracked instrument, a first image acquisition system, a second image acquisition system, and a computer system with a processor and a memory, the tracked instrument having a plurality of sensors configured to provide a tracked instrument dataset, the computer system in communication with the augmented reality system, the tracked instrument, the first image acquisition system, and the second image acquisition system;
    acquiring, by the first image acquisition system, a first holographic image dataset from the patient;
    acquiring, by the second image acquisition system, a second holographic image dataset from the patient;
    tracking, by the computer system, the tracked instrument using the plurality of sensors to provide the tracked instrument dataset;
    registering, by the computer system, the first holographic image dataset, the second holographic image dataset, and the tracked instrument dataset with the patient;
    rendering, by the augmented reality system, a first hologram from the first holographic image dataset, a second hologram from the second holographic image dataset, and a treatment zone hologram from the tracked instrument dataset;
    adjusting, with the computer system, the treatment zone hologram;
    stamping, by the practitioner, the treatment zone hologram to lock in a planned trajectory, depth, and predictive treatment zone;
    rendering, by the augmented reality system, a guide hologram based on the stamped treatment zone hologram; and
    performing, by the practitioner, the interventional procedure on the patient while viewing the patient, the first hologram, and the guide hologram with the augmented reality system, whereby the practitioner employs the guide hologram and the augmented reality system for placement of the tracked instrument during the interventional procedure.

2. The method of claim 1, wherein the adjusting, with the computer system, the treatment zone hologram and the rendering, by the augmented reality system, the guide hologram are performed until an entire treatment area is covered by the treatment zone hologram.

3. The method of claim 1, wherein the first image acquisition system is one of a magnetic resonance imaging (MRI) apparatus and a computerized tomography (CT) apparatus.

4. The method of claim 2, wherein the first holographic image dataset from the patient is one of a preoperative image and a perioperative feedback loop.

5. The method of claim 1, wherein the first holographic image dataset from the patient is preoperative.

6. The method of claim 1, wherein the second image acquisition system is an ultrasound apparatus.

7. The method of claim 1, wherein the method includes use of a plurality of tracked instruments having a plurality of treatment zone holograms.

8. The method of claim 1, further comprising a step of assessing the treatment zone hologram versus reality.

9. The method of claim 1, further comprising a step of using the augmented reality system to simultaneously display the first hologram and the treatment zone hologram.

10. The method of claim 9, wherein the guide hologram is displayed simultaneously with the first hologram and the treatment zone hologram.

11. The method of claim 1, further comprising a step of collecting, by the computer system, operating information.

12. The method of claim 11, wherein the operating information includes real-time navigation instructions.

13. The method of claim 1, further comprising a step of projecting, by the augmented reality system, operating information over the tracked instrument.

14. The method of claim 1, wherein the guide hologram includes at least one of a hub, a guide path, and a hoop.

15. The method of claim 1, further comprising a step of generating, by the augmented reality system, a feedback based on the first holographic image dataset, the second holographic image dataset, and the tracked instrument dataset.

16. The method of claim 15, wherein the feedback includes at least one of visual feedback, auditory feedback, and numerical holographic feedback.

17. The method of claim 1, further comprising recording, using the computer system, a member selected from a group consisting of: the first holographic image dataset, the second holographic image dataset, the tracked instrument dataset, the guide hologram, and combinations thereof.

18. The method of claim 1, wherein the guide hologram is within a treatment zone at a distance from the tracked instrument.

19. A system for planning and performing an interventional procedure on a patient by a practitioner, comprising:
an augmented reality system;
a tracked instrument having a plurality of sensors;
a first image acquisition system configured to acquire a first holographic image dataset from the patient;
a second image acquisition system configured to acquire a second holographic image dataset from the patient;
a computer system with a processor and a memory, the computer system in communication with the augmented reality system, the tracked instrument, the first image acquisition system, and the second image acquisition system and configured by machine-readable instructions to:
track the tracked instrument using the plurality of sensors to provide a tracked instrument dataset;
register the first holographic image dataset, the second holographic image dataset, and the tracked instrument dataset with the patient;
receive stamping input from the practitioner via the augmented reality system to lock in a planned trajectory, depth, and predictive treatment zone of a treatment zone hologram and,
wherein the augmented reality system is configured to render a first hologram, a second hologram, a treatment zone hologram, and a guide hologram based on the stamping input from the practitioner for viewing by the practitioner, and
wherein the first hologram and the guide hologram are displayed to the practitioner during the interventional procedure on the patient using the augmented reality system, and the guide hologram and the augmented reality system are configured for use by the practitioner for placement of the tracked instrument during the interventional procedure.

20. The method of claim 1, wherein the stamping step includes using at least one of a voice command and a hand gesture to lock in the planned trajectory, depth, and predictive treatment zone, and wherein the method further comprises repeating the adjusting and stamping steps until an entire treatment area is covered by a plurality of stamped treatment zone holograms.

* * * * *